Oct. 12, 1965

A. BENDER ETAL  3,211,164
VALVE WITH THREADED SEAT SLEEVE AND METHOD OF ASSEMBLY

Filed Dec. 2, 1963  2 Sheets-Sheet 1

ALFRED BENDER
HEINZ-DIETER STEINKE
*INVENTORS.*

BY

*Mestern, Ross &*

United States Patent Office 3,211,164
Patented Oct. 12, 1965

3,211,164
VALVE WITH THREADED SEAT SLEEVE
AND METHOD OF ASSEMBLY
Alfred Bender, Hofheim, Taunus, and Heinz-Dieter Steinke, Frankfurt am Main, Germany, assignors to Alfred Teves Maschinen- u. Armaturenfabrik K.G., Frankfurt am Main, Germany, a corporation of Germany
Filed Dec. 2, 1963, Ser. No. 327,197
Claims priority, application Germany, Jan. 23, 1963, T 23,370
4 Claims. (Cl. 137—15)

Our present invention relates to valves and, more particularly, to an improved valve construction of the type wherein an axially shiftable valve member is slidably received in a valve liner secured to a housing.

It is known to provide valves of the aforementioned character with sleeve members or the like having a plurality of passages registering with those of the valve housing and maintained, in conventional operation, at different hydraulic pressures. These passages, which can be annular compartments, grooves or the like, or generally separated by annular seals (e.g. O-rings) or the like to block communication between the passages or compartments along any interstices between the sleeve members and the valve housing. Thus some known valves are provided with circumferential grooves, intermediate the fluid-conducting passages, in which an O-ring is inserted. In efforts to avoid the disadvantages of such structures, namely the short life of the O-ring or sealing member, it has been proposed to press-fit the sleeve member within the valve housing in such manner that the sleeve member is neither axially shiftable within the latter nor rotatable therein and has a configuration so closely complementing the configuration of the valve housing that no communication exists between the passages. Such a construction can, however, be attained only if extreme care is taken in dimensioning the interfitting parts of the valve and in ensuring that the complementary surfaces of the sleeve member in the valve housing have sufficiently fine finishes that no leakage path can exist. The expense of such constructions has prevented their widespread acceptance, while repeated actuation of the valve by axial reciprocation of the actuating member frequently leads to loosening of the sleeve member within the valve housing and the establishment of a leakage path between the passages through the gaps formed between the sleeve member and the housing.

It is, therefore, the principal object of the present invention to provide an improved valve construction of the type wherein an axially extending actuating member is slidably displaceable within a tubular valve body.

Another object of our invention is to provide a valve of this character, having the valve housing and the sleeve member fixed thereto, wherein loosening of the sleeve member within the valve housing is prevented and no leakage path can exist between the fluid passages intermediate the sleeve member and the housing.

Yet another object of this invention is to provide an improved and relatively inexpensive system for sealingly securing a sleeve member or lining to a valve housing.

A further object of our present invention is to provide a simplified and efficient method of producing a valve of the aforedescribed type.

These objects, and others which will become apparent hereinafter, are attained, in accordance with the present invention, by providing a valve for a fluid system which comprises an internally threaded tubular valve housing and an externally threaded sleeve member threadedly received in the housing and formed with at least one inlet and at least one outlet for the fluid, an axially extending actuating member slidably passing through the sleeve member for effecting communication between the inlet and the outlet. An essential feature of the present invention resides in the provision of a layer of a hardenable, synthetic-resin cementitious material, which can be thermoplastic or thermosetting, between the threads of the housing and other sleeve members, at least along threaded portions of the latter, intermediate the inlet and outlet for bonding the sleeve member to the housing while blocking communication between the inlet and outlet, along these threads, the synthetic-resin material filling the gaps generally present as a consequence of the normal play in the thread. Thus the tubular valve housing may be provided with a plurality of axially spaced transverse passages, preferably in communication with respective angular compartments or grooves, respectively aligned with the inlet and the outlet when the sleeve member is threadedly received within the housing.

Upon hardening of the synthetic-resin material, the sleeve member is fixed within the housing against both axial and rotatable displacement, the synthetic resin simultaneously forming a seal preventing leakage of the fluid between the compartments. The compartments may be formed by nonthreaded portions of the sleeve members, which are of reduced cross-section and are provided at the inlet and the outlet, the nonthreaded portions being bracketed by threaded portions mating with the internal threads of the housing. Thus the hardenable synthetic resin may coat the threads along these threaded portions, which separate the compartments and passages registering with the inlet and the outlet to ensure a permanent, fluid-tight seal between the compartments.

The present invention also contemplates an improved method of making a valve of this character. We have found that best results are obtained when the threads of the sleeve member or the housing are coated with the synthetic-resin material prior to insertion of the sleeve member within the housing. After coating, the sleeve member can be screwed into the tubular valve housing so that the synthetic-resin material fills any interstices that may exist between the mating threads. Since there will be some tendency for excess synthetic resin to accumulate in the threads between the threaded portions of the sleeve member, we have found it important to remove this excess material by flushing the passages and compartments with a solvent for the synthetic resin material. Subsequently or concurrently, the synthetic-resin material is permitted to harden and thereby to form a permanent seal between the compartments while firmly bonding the sleeve member to the tubular valve housing. According to another feature of this invention, the interior of the sleeve member is only roughed-out prior to its insertion into the valve housing and is, upon hardening of the synthetic resin, finish-machined to the desired dimension, the axially shiftable valve member being then inserted into the interior of the sleeve member in the usual manner. In this way it is possible to ensure concentricity between the valve housing and the bore of the sleeve member in spite of the fact that there may be some intentional play between the latter and the valve housing in order to accommodate the synthetic-resin material.

The above and other objects, features and advantages of the present invention will become more readily apparent from the following description, reference being made to the accompanying drawing in which.

Figure 1:
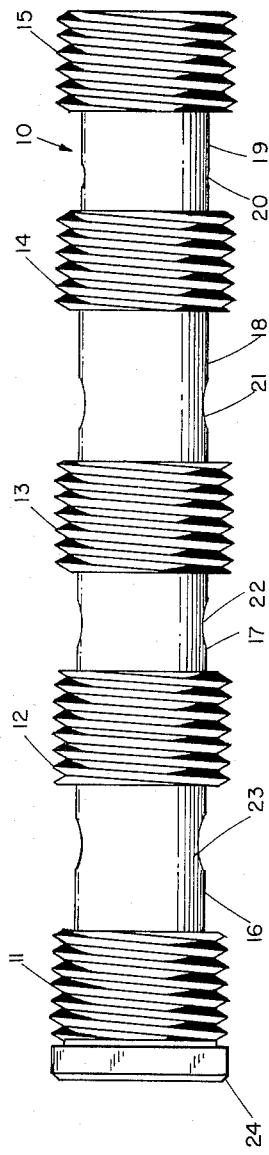
FIG. 1 is an elevational view of a sleeve member for a valve according to the present invention.
Figure 2:
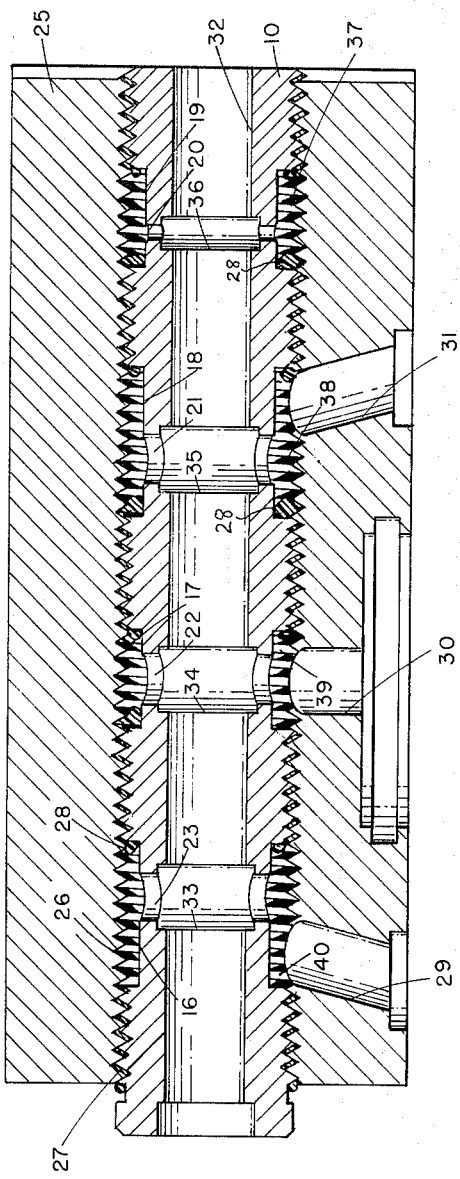
FIG. 2 shows the valve body in axial cross-section after insertion of the sleeve member into the valve housing.

In FIG. 1 we show a sleeve member 10 having threaded portions 11, 12, 13, 14 and 15, which are coated with a synthetic-resin cementitious material prior to insertion of the sleeve member into the valve housing 25 illustrated in FIG. 2. The threaded portions 11–15 bracket nonthreaded portions 16, 17, 18, 19 of reduced cross-section, these portions of reduced cross-section forming respective compartments with the valve housing which communicates with the roughed-out interior of sleeve member 10 via transverse bores 20–23. A prismatic portion 24 at one end of the sleeve member 10 serves to permit the latter to be screwed into the valve housing 25.

Figure 3:
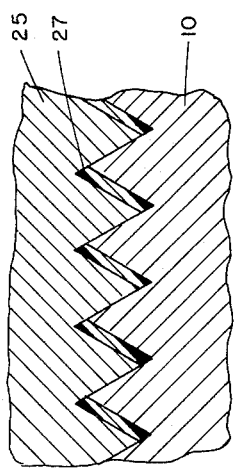
FIG. 3 is a detail view, drawn to enlarged scale, showing the mating threads of the valve housing and the sleeve member in axial cross-section.

As will be clear from FIG. 2, the valve housing 25 has an internal thread 26 into which the sleeve member 10 is threaded with play after being coated with the synthetic-resin material 7. This material fills the gaps between the threads, the excess material 28 accumulating within compartments 37–40 formed by portions 19, 18, 17 and 16 of reduced cross-section. These compartments communicate with respective passages 29, 30 and 31 (only three of which are shown) by means of which the high- or low-pressure side of a hydraulic system may be connected to the valve. The interior of the sleeve member 10 is provided with a roughed-out axially extending bore 32 and a plurality of annular compartments 33–36 communicating with respective bores 23, 22, 21 and 20 interconnecting these annular grooves with the external compartments 40, 39, 38 and 37, respectively. While the interstices between threads of the sleeve member and the housing will not invariably lie along one flank of the threads as illustrated in FIGS. 2 and 3, this is generally the rule so that the cementitious material 27 forms a substantially complete annular seal blocking communication between the passages 29–31 via the compartments 37–40 along the threaded portions 11–15 of the sleeve member.

The synthetic resin may be a hardenable elastomeric material such as a thermoplastic ABS copolymer (the copolymer of acrylonitrile, butadiene and styrene marketed under the trade name Cyclolac) applied to the threads (after heating to a flowable state at a temperature of about 200° C.) prior to screwing the sleeve member 10 into valve housing 25. The passages 29–31, compartments 38–40, and bores 20–23 are then flushed with a solvent for the synthetic resin (i.e. methylethylketone in the case of the ABS resin), whereupon the resin is permitted to cool and harden. The interior bore 32 may then be finished (e.g. by reaming, internal boring, internal grinding) and grooves 33–36 formed in the sleeve member 10.

Figure 4:
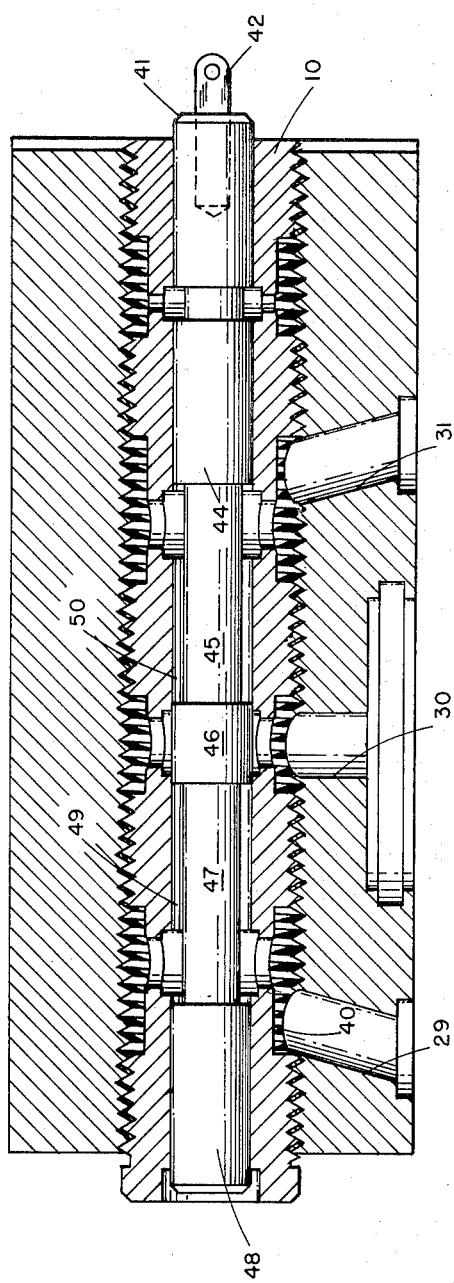
FIG. 4 is an axial cross-sectional view through a valve housing with the actuating member disposed therein.

The actuating member 41, which can be connected to a lever or the like for reciprocation via a pin 42, can then be inserted into the sleeve member 10. The actuating member 41 is shown to have portions 45 and 47 of reduced cross-section, these portions forming compartments 50 and 49 within the sleeve member 10 and working portions 44, 46 and 48. A passage 30 is assumed to be connected to a source of elevated fluid pressure (e.g. a hydraulic pump), displacement of the actuating member to the right (FIG. 4) will effect communication between passage 30, and outward passage 29 via compartment 49. Similarly, displacement of the actuating member 41 to the left may connect inlet 30 with outlet 31 via passage 50. In a similar manner, bore 20 may be connected to a reservoir or sump for discharging fluid from passage 31 if desired. It will be immediately apparent that the synthetic resin 29 not only provides a fluide-type seal intermediate the various fluid passages but also serves to bond the sleeve member 10 to the valve housing 25 in such manner that there is no danger that reciprocation of actuating member 41 will cause axial or rotary loosening of the sleeve member within the valve housing.

*Example*

A thermosetting resin consisting of 70 parts by weight of epoxy resin (molecular weight 3,000) and 30 parts by weight of urea-formaldehyde resin is admixed in a proportion of 30% by weight with 70% by weight of a solvent vehicle consisting of equal amounts of methyl isobutyl carbinol, methyl isobutyl ketone, toluene and xylene and is deposited on the threads of the sleeve member. The excess is removed immediately after assembly of the valve body by flushing with xylene. The bond was cured at 80° C. for 5 hours.

The invention described and illustrated is believed to admit of many modifications within the ability of persons skilled in the art, all such modifications being considered within the spirit and scope of the appended claims.

What is claimed is:

1. A valve for fluid systems, comprising an elongated internally threaded tubular valve housing provided with a plurality of axially spaced transverse passages; an externally threaded sleeve member threadedly received in said housing and formed with at least one inlet and at least one outlet for a fluid respectively aligned with said passages, said sleeve member having nonthreaded portions of reduced cross-section at said inlet and said outlet, said portions of reduced cross-section being bracketed by threaded portions mating with the internal threads of said housing; an axially extending actuating member slidably received in said sleeve member for effecting communication between said inlet and said outlet; and a layer of a hardenable, synthetic-resin cementitious material sealingly interposed between the threads of said housing and of said sleeve member only along said threaded portions intermediate said passages for bonding said sleeve member to said housing while blocking fluid communication between said passages along said threads, said layer being interposed between the threads of said housing and sleeve member and extending up to said portions of reduced cross-section while completely coating said threaded portions.

2. A method of making a valve for a fluid system, comprising the steps of coating the threads of an externally threaded sleeve member, provided with at least one transverse inlet and at least one outlet, with a hardenable, synthetic-resin cementitious material; screwing said sleeve member into an internally threaded tubular valve housing provided with a plurality of axially spaced passages respectively aligned with said inlet and said outlet, said sleeve member having nonthreaded annulus-forming portions of reduced cross-section at said inlet and said outlet in registry with said passages thereby forcing portions of excess material into the annuluses formed by said nonthreaded portions; removing excess material prior to hardening thereof by flushing said passages with a solvent for said material; and hardening the remaining material to bond said sleeve member to said housing and to block fluid communication between said inlet and said outlet along said threads.

3. A method of making a valve for a fluid system, comprising the steps of coating the threads of an externally threaded, rough-interior sleeve member with a hardenable, synthetic-resin cementitious material; screwing said sleeve member into an internally threaded tubular valve housing provided with a plurality of axially spaced passages respectively aligned with said inlet and said outlet, said sleeve member having nonthreaded annulus-forming portions of reduced cross-section at said inlet and said outlet in registry with said passages, thereby forcing portions of excess material into the annuluses formed by said nonthreaded portions; removing excess material prior to hardening thereof by flushing said passages with a solvent for said material; hardening the remaining material to bond said sleeve member to said housing; thereafter finishing the interior of said sleeve member; and inserting an axially shiftable valve member into the interior of said sleeve member.

4. A method of making a valve for a fluid system, comprising the steps of coating the threads of an externally threaded, rough-interior sleeve member, provided with at least one transverse inlet and at least one outlet, with a hardenable, synthetic-resin cementitious material; screwing said sleeve member into an internally threaded tubular valve housing provided with a plurality of axially spaced passages respectively aligned with said inlet and said outlet, said sleeve member having nonthreaded annulus-forming portions of reduced cross-section at said inlet and said outlet in registry with said passages, thereby forcing portions of excess material into the annuluses formed by said nonthreaded portions; removing excess material prior to hardening thereof by flushing said passages with a solvent for said material; hardening the remaining material to bond said sleeve member to said housing and to block fluid communication between said inlet and said outlet along said threads; thereafter finishing the interior of said sleeve member; and inserting an axially shiftable valve member into the interior of said sleeve member.

References Cited by the Examiner

UNITED STATES PATENTS

| | | | |
|---|---|---|---|
| 1,503,683 | 8/24 | Darling | 137—625.48 |
| 2,016,878 | 10/35 | Vickers | 251—324 X |
| 2,910,081 | 10/59 | Karbowniczek | 137—625.68 X |
| 3,101,207 | 8/63 | Pavel et al. | 285—55 X |

FOREIGN PATENTS

| | | |
|---|---|---|
| 514,296 | 7/55 | Canada. |

MARTIN P. SCHWADRON, *Acting Primary Examiner.*

M. CARY NELSON, *Examiner.*